(12) United States Patent
Einsiedel et al.

(10) Patent No.: US 6,557,902 B1
(45) Date of Patent: May 6, 2003

(54) AIRBAG ARRANGEMENT

(75) Inventors: Heinrich Einsiedel, Ulm (DE); Oliver Glöckler, Nersingen (DE); Maximilian Waimer, Jettingen (DE)

(73) Assignee: Takata (Europe) Vehicle Safety Technology GmbH, Ulm (DE)

( * ) Notice: Subject to any disclaimer, the term of this patent is extended or adjusted under 35 U.S.C. 154(b) by 0 days.

(21) Appl. No.: 09/455,179

(22) Filed: Dec. 6, 1999

(30) Foreign Application Priority Data

Dec. 7, 1998  (DE) .......................................... 198 56 382

(51) Int. Cl.[7] ............................................... F16L 27/04
(52) U.S. Cl. ............................. 285/261; 280/741; 222/3
(58) Field of Search ........................... 285/261, 50, 270, 285/271, 263, 266, 322, 323, 243; 280/730.2, 741, 736, 742, 728.1, 730.1; 222/3; 283/233, 234

(56) References Cited

U.S. PATENT DOCUMENTS

| | | | | |
|---|---|---|---|---|
| 1,001,069 A | * | 8/1911 | Nielsen ....................... 285/322 |
| 1,977,241 A | * | 10/1934 | Parker ......................... 285/263 |
| 2,319,939 A | * | 5/1943 | Markey ....................... 285/263 |
| 4,564,222 A | * | 1/1986 | Loker et al. ................. 285/243 |
| 4,813,575 A | * | 3/1989 | O'Connor .................... 222/147 |
| 5,004,013 A | * | 4/1991 | Beaston .................. 137/614.05 |
| 5,110,013 A | * | 5/1992 | Clark et al. .................... 141/18 |
| 5,332,267 A | * | 7/1994 | Harrison ...................... 285/263 |
| 5,353,836 A | * | 10/1994 | deCler et al. ........... 137/614.03 |
| 5,407,096 A | * | 4/1995 | Smith .......................... 137/881 |
| 5,924,723 A | * | 7/1999 | Brantman et al. ........ 280/730.2 |
| 5,975,490 A | * | 11/1999 | Essman .................... 251/149.4 |
| 6,241,291 B1 | * | 6/2001 | Hui-Chen ................... 285/323 |

FOREIGN PATENT DOCUMENTS

| | | |
|---|---|---|
| DE | 26 27 375 | 12/1977 |
| DE | 26 31 984 | 1/1978 |
| DE | 296 13 781 | 11/1996 |

* cited by examiner

*Primary Examiner*—Lynne H. Browne
*Assistant Examiner*—Aaron Dunwoody
(74) *Attorney, Agent, or Firm*—Foley & Lardner

(57) ABSTRACT

The present invention includes an airbag arrangement which includes an airbag, a gas tube connected to the airbag, a gas generator having at least one gas outlet, and a jointed connection designed as a ball and socket joint for connecting the gas outlet with the gas tube.

12 Claims, 2 Drawing Sheets

AIRBAG ARRANGEMENT

BACKGROUND OF THE INVENTION

The invention relates to a gas generator comprising at least one gas outlet to which a gas tube is connected.

Gas generators of this kind are for example used in motor vehicles and serve to inflate the airbag in the event of an accident via the gas tube which is plugged into the interior of a folded airbag and which can be provided with a plurality of gas outlet openings. The positions at which the gas generator and the airbag are arranged in the vehicle are predetermined so that the gas generator and the gas tube are to be mounted at a relative orientation which is matched to the respective vehicle. In this it must also be taken into account that relative movements between the gas tube and the gas generator can be produced through vehicle body movements which arise during the operation of the vehicle.

The problem (object) on which the invention is based is to provide a gas generator of the initially named kind which is as simple to mount as possible and the capability of functioning of which in the mounted state is lastingly ensured.

SUMMARY OF THE INVENTION

In accordance with the invention a jointedly connected component consisting of a gas generator and a gas tube is created which can be adapted in a simple manner to the circumstances of the respective vehicle. The invention is advantageous in particular for applications in which long gas tubes are used to inflate side airbags which expand downwardly starting from the vehicle roof in the manner of a curtain in the event of an accident. In particular in gas tubes with a great length, which e.g. can amount to more than 1 m, the invention prevents small angular movements during the mounting of the gas generator from resulting in large deviations in the desired position of the gas tube in the vehicle, since the angular position of the gas tube can be matched exactly to the circumstances of the respective vehicle. Low and in principal acceptable installation tolerances in the region of the gas generator can thus not lead to unacceptable deviations from the predetermined installation position of the gas tube and of the airbag.

The jointed connection which is provided in accordance with the invention between the gas outlet of the gas generator and the gas tube thus enables installation tolerances in the region of the gas generator to be compensated already at the gas generator through a corresponding displacement of the gas tube, and thus a correct position of the gas tube and the airbag in the vehicle always to be ensured. In this way the mounting of airbag modules is considerably simplified through the invention.

A further advantage of the jointed connection in accordance with the invention consists in that movements of the vehicle body, which arise during the operation of the vehicle and which lead to a relative movement between the gas generator and the gas tube, are compensated, whereby the occurrence of damages and leaks in the region of the connection between the gas tube and the gas generator is avoided.

In accordance with a preferred embodiment of the invention the jointed connection is designed as a ball and socket joint.

Through this the gas tube can be adjusted continuously in any desired direction.

In accordance with a further preferred exemplary embodiment of the invention the gas tube is secured with a clamping ring to the gas outlet, with a run-up inclination being provided at the gas outlet and/or at the clamping ring.

Through this a relative movement between the clamping ring and the gas outlet in a direction which is predetermined by the run-up inclination can be produced during the clamping of the clamping ring in order to draw the gas tube towards the gas outlet and to fix it between the clamping ring and the gas outlet by means of the clamping ring.

If in accordance with a further preferred embodiment of the invention the clamping ring is held by a clamp and an airbag is clamped between the clamping ring and the clamp, the gas tube can be held at the gas outlet and the airbag at the clamping ring at the same time by a tightening of the clamp. In this way the pre-mounting of the component comprising a gas generator, the gas tube, the airbag and the clamping ring can be considerably simplified.

In accordance with a further preferred exemplary embodiment of the invention a line contact is provided between a clamping ring and the gas tube.

In this way, the friction between the clamping ring and the gas tube is minimized so that the gas tube can be easily adjusted and nevertheless be held securely at the gas outlet.

BRIEF DESCRIPTION OF THE DRAWINGS

The invention will be explained in the following in an exemplary manner with reference to the drawings. Shown are:

FIGS. 1a, 1b and 1c each show a pre-mounting state in which a gas tube 14 is fixed by means of a cylindrical clamping ring 16 to a gas generator in accordance with the invention, of which in each case only a gas outlet 12 is illustrated which is formed as a separate component.

DETAILED DESCRIPTION OF THE INVENTION

Figure 1A:
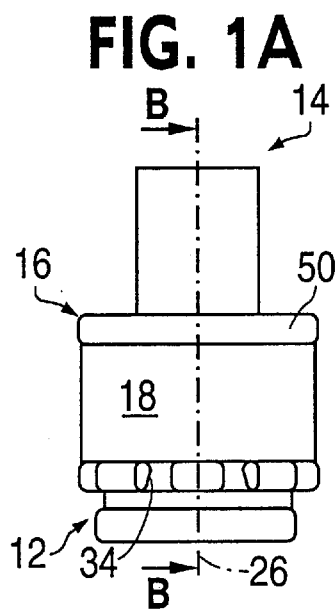
FIG. 1a a side view of an arrangement consisting of a gas tube, a clamping ring and a gas outlet of a partly illustrated gas generator in accordance with an embodiment of the invention, FIG. 1b a sectioned view in accordance with line B/B of FIG. 1a, FIG. 1c a view corresponding to FIG. 1b with a gas tube at an inclination with respect to the gas outlet, and FIGS. 2–4 various possibilities in accordance with the invention of the attachment of a gas outlet to a partly illustrated gas generator.
Figure 1B:
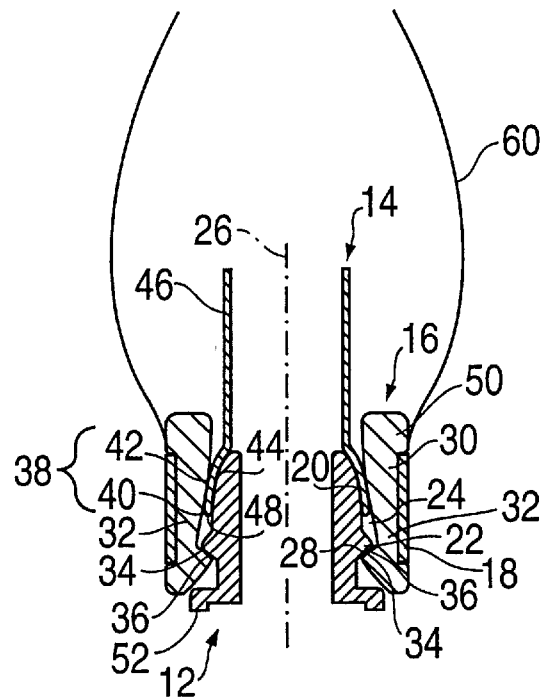

In FIG. 1a only a part of the gas outlet 12 of the gas generator can be seen. As the sectional view of FIG. 1b shows, the gas outlet 12 is surrounded by the clamping ring 16, which can be contracted by means of the clamp 18 and which serves to fix the gas tube 14, which is jointedly connected to the gas outlet 12, to the gas outlet 12. The clamp 18 is a flat metal strip and is arranged in a correspondingly designed peripheral cut-out on the outer side of the clamping ring 16.

The gas outlet 12 can be attached via a coupling section 52 to the gas generator. The end of the gas outlet 12 which cooperates with the gas tube 14 is designed as a spherical region and comprises at its outer side a convexly curved support surface 20 which merges into a ring shoulder 22. The transition region between the support surface 20 and the ring shoulder 22 is cut free or, respectively, provided with an undercut 24.

At its side facing away from the convex support surface 20, the ring shoulder 22 has a run-up inclination 28 which extends at an inclination with respect to a middle axis 26 of the gas outlet 12.

The clamping ring 16 comprises a ring-shaped section 30, from which legs 32 project which are uniformly distributedly arranged in the peripheral direction. In FIG. 1a only end regions of the legs 32 can be seen which in each case are provided with a radially inwardly projecting holder section 34. The clamping ring 16 is designed in a single piece and consists of a plastic material of high strength so that a comparatively large force is required for pressing the legs 32 together or apart, respectively.

The holder sections 34 of the legs 32 are in each case provided with a run-up inclination 36 which cooperates with the run-up inclination 28 of the ring shoulder 22. The clamping ring 16 is latched to the gas outlet 12 in such a manner that the legs 32 engage with their holder sections 34 behind the ring shoulder 22 in a locking manner.

The inner side of the clamping ring 16 has a support surface 38 comprising a planar region 40 which extends at an inclination with respect to the middle axis 26 of the gas outlet 12 and a spherical, concavely curved region 42, with the concave region 42 being less strongly curved than the convex support surface 20 of the gas outlet 12. The support surface 38 is formed by the inner side of the ring section 30 as well as by the inner sides of the legs 32, with it being possible for the ratio of the respective contributions to vary in dependence on the length of the legs 32. The legs 32 preferably form the planar region 40, and the ring section 30 preferably forms the concave region 42 of the support surface 38.

Figure 1C:
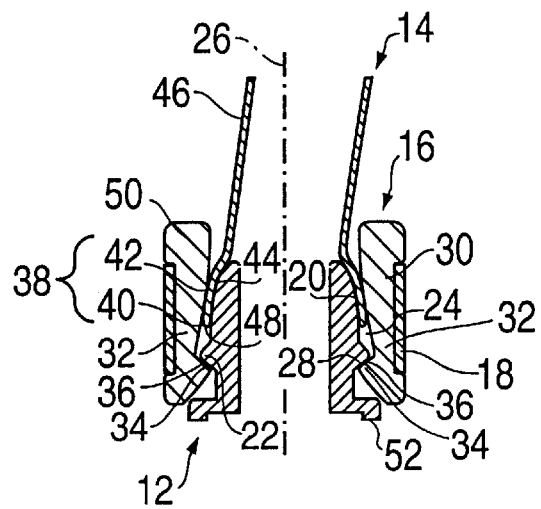

In the pre-mounting state in accordance with FIGS. 1a, 1b and 1c, the ring section 30 of the clamping ring 16 extends beyond the free end of the gas outlet 12 and has a flange 50. In the region of the flange 50, the gas outlet 12 is designed conically with an inner wall extending towards the coupling section 52 at an inclination with respect to the middle axis 26.

At its end cooperating with the gas outlet 12, the gas tube 14, which is manufactured from aluminum, has a spherical region 44 which forms a transition region between a tube section 46 of smaller diameter and a circular cylindrical end section 48 of larger diameter. The length of the tube section 46 varies in dependence on the circumstances in the respective vehicle and can for example amount to more than 1 m. Furthermore, the tube section 46 can be provided with gas outlet holes via which gas, which is pressed into the gas tube 14 by means of the gas generator, can flow into a non-illustrated airbag.

The curvature of the spherical region 44 of the gas tube 14 corresponds to the curvature of the concave support surface 20. As a result the gas tube 14 is more strongly curved in the spherical region 44 than the concave region 42 of the clamping ring 16 so that a line contact is present between the clamping ring 16 and the gas tube 14.

The inner diameter of the gas tube 14 in the region of its circular cylindrical end section 48 is slightly smaller than the maximum diameter of the gas outlet 12 in the region provided with the spherical support surface 20. As a result, a resistance is to be overcome in plugging the gas tube 14 onto the gas outlet 12, with the gas outlet 12 being non-losably held at the gas outlet 12 and thus at the gas generator in the state of being plugged on and not yet secured by the clamping ring 16.

Between the gas tube 14 and the gas outlet 12 there is a jointed connection when plugged together, with the spherical region 44 of the gas tube 14 and the spherical support surface 20 of the gas outlet 12 cooperating in the manner of a ball and socket joint. The gas tube 14 can therefore be tilted in any desired direction with respect to the gas generator. The maximum adjustment angle, that is, the maximum angle between the middle axis 26 of the gas outlet 12 and the middle axis of the gas tube 14, is determined by the flange 50 of the clamping ring 16.

In FIG. 1c, the gas tube 14 is illustrated at an inclination with respect to the middle axis 26 of the gas outlet 12, with the maximum adjustment angle not yet being achieved. From FIG. 1c it can be seen that the undercut 24 of the gas outlet 12 serves to enable a movement of the front-end tube end along the spherical support surface 20 towards the middle axis 26 of the gas outlet 12 during angular adjustment of the gas tube 14.

For the manufacture of the jointed connection, the gas tube 14 is first plugged onto the gas outlet 12 so that the inner side of the spherical region 44 of the gas tube 14 lies in contact at the spherical support surface 20 of the gas outlet 12.

Then, the clamping ring 16 is pushed over the gas tube 14 and pressed onto the gas outlet 12, with the legs 32 being pressed out vardly due the ring shoulder 22 and finally snapping with their holder sections 34 behind the ring shoulder 22, so that the run-up inclinations 28, 36 make contact with one another and the clamping ring 16 is latched to the gas outlet 12.

The clamping ring 16 can already be pushed over the gas tube 14 prior to plugging the gas tube 14 onto the gas outlet 12, with the clamping ring 16 lying loosely in contact with its legs 32 on the spherical region 44 and with it not being possible for the clamping ring 16 to get lost.

Airbag 60 can be secured to the clamping ring 16 for example by being drawn over the gas tube 14 and being arranged with its mouthpiece between the clamping ring 16 and the clamp 18 prior to tightening the clamp 28.

By tightening of the clamp 18, the free end regions of the legs 32 which are provided with the holder sections 34, are pressed radially inwardly so that the holder sections 34 slide with their run-up inclinations 36 along the run-up inclination 28 of the ring shoulder 22 and in this provide for a movement of the clamping ring 16 parallel to the middle axis 26 towards the coupling section 52 of the gas outlet 12.

As a result, the gas tube 14 is clamped with its spherical region 44 between the support surface 20 of the gas outlet 12 and the support surface 38 of the clamping ring 16 through tightening of the clamp 18.

In this the clamp 18 can first be tightened only slightly in order to exert a comparatively low clamping force on the gas tube 14, which certainly permits the setting of the desired angular position, but prevents the gas tube 14 from subsequently changing the adjusted position by itself. As a result of the line contact between the clamping ring 16 and the gas tube 14, the frictional forces which are to be overcome for moving the gas tube 14, are relatively low. By tightening the clamp 18, the gas tube 14 can then be fixed in its final position.

Through the mutually matched shapes of the spherical support surface 20 of the gas outlet 12 and the spherical region 44 of the gas tube 14, the gas imperviousness in the region of the transition between the gas outlet 12 and the gas tube 14 is ensured even when a change of angular position takes place between the gas tube 14 and the gas outlet 12 while the clamping ring 16 is tightened.

It can be seen in particular in FIG. 1c that only at maximum inclination of the gas tube 14—which has not yet been reached in FIG. 1c—, when the gas tube 14 lies in contact with its tube section 46 at the flange 50 of the gas outlet 12, does the circular cylindrical end section 48 of the gas tube 14 extend approximately parallel to the planar region 40 of the support surface 38 of the clamping ring 16.

The maximum clamping force which can be exerted on the gas tube 14 by means of the clamping ring 16, is determined by the maximum diameter of the ring shoulder 22, which in the pre-mounting state in accordance with FIGS. 1a, 1b and 1c lies in contact at the inner wall of the clamping ring 16 in the region of the transition between the planar region 40 and the holder sections 34 of the legs 32. Thus, the legs 32 cannot be pressed together any further, so that the clamping ring 16 can not be moved any further towards the coupling section 52 through further tightening of the clamp 18, and the clamping force which is exerted on the gas tube 14 can not be increased any further.

Following the mounting of the gas generator in the vehicle, first the desired angular position of the gas tube 14 is set. The gas tube 14 may previously be subjected to a comparatively low clamping force through tightening of the clamp 18, in order that the gas tube 14 remains in the respective set position and does not change the adjusted position by itself, in particular due to its own weight. Once the gas tube 14 has been brought into the predetermined position, it is fixed by tightening the clamp 18. The maximum force which can be achieved can be dimensioned in such a manner that a relative movement between the gas tube 14 and the gas generator is still possible in order to be able to compensate movements of the vehicle body.

Figure 2:
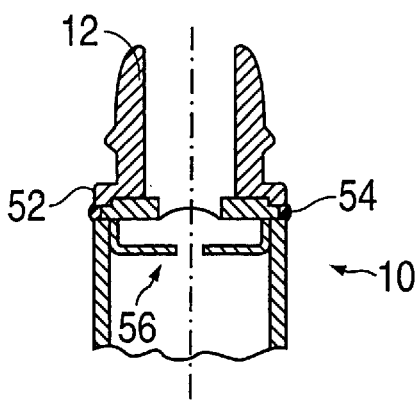

In accordance with FIG. 2, the gas outlet 12 is designed as a separate component and is welded via a welding seam 54 with its coupling section 52 to the merely partly illustrated gas generator 10. In FIG. 2 a sieve unit 56 can also be seen which prevents the intrusion of particles into the gas tube 14 which could lead to damage to the non-illustrated airbag.

Figure 3:
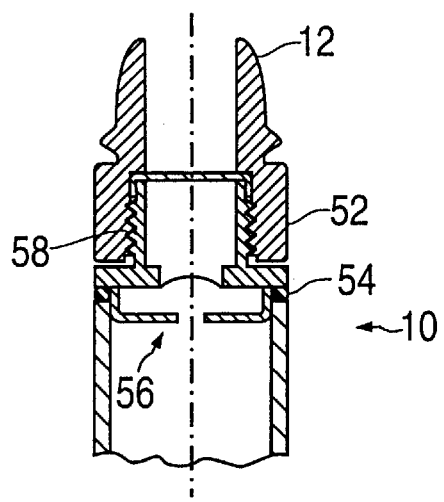

In the embodiment in accordance with FIG. 3, the gas outlet 12, which is again designed as a separate component, is screwed to the gas generator 10. The gas generator 10 is provided with a threaded extension 58 of reduced diameter which has an outer thread and onto which the gas outlet 12 is screwed with its coupling section 52. The threaded extension 58 is welded to the gas generator 10 via a welding seam 54. In the embodiment in accordance with FIG. 3, the gas generator 10 is provided with a sieve unit 56, too.

Figure 4:
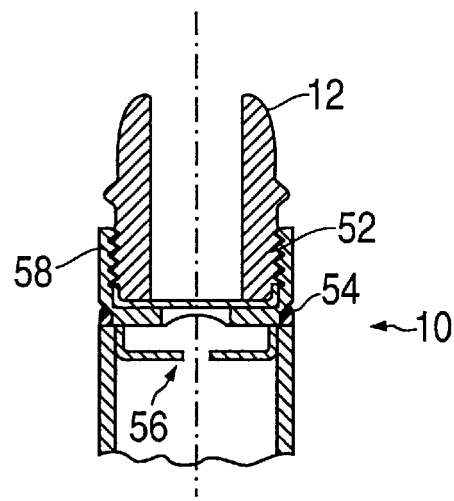

In the embodiment of FIG. 4, the coupling section 52 of the gas outlet 12 is provided with a thread on its outer side and is screwed into the threaded extension 58 of the gas generator 10. The gas generator 10 is welded to the threaded extension 58 via a welding seam 54 and is provided with a sieve unit 56.

In principle the threaded extension 58 may also be designed in each case in a single piece with the gas generator 10.

In deviation from the embodiments described above, the gas outlet 12 may also be designed as an integral constituent of the gas generator 10.

List of Reference Symbols 10 gas generator
12 gas outlet
14 gas tube
16 clamping ring
18 clamp
20 support surface
22 ring shoulder
24 undercut
26 middle axis
28 run-up inclination
30 ring section
32 legs
34 holder sections
36 run-up inclinations
38 support surface
40 planar region
42 concave region
44 spherical region
46 tube section
48 end section
50 flange
52 coupling section
54 welding seam
56 sieve unit
58 threaded extension

What is claimed is:

1. An airbag arrangement, comprising:
   an airbag;
   a gas tube connected to the airbag;
   a gas generator having at least one gas outlet connected with the gas tube; and
   a ball and socket joint for connecting the gas outlet with the gas tube; and,
   wherein the gas tube and the gas outlet each have a substantially spherically curved region.

2. An airbag arrangement in accordance with claim 1, wherein the gas tube is secured to the gas outlet by a clamping ring which is held by a clamp.

3. An airbag arrangement in accordance with claim 2, wherein the airbag is clamped between the clamping ring and the clamp.

4. An airbag arrangement in accordance with claim 2, wherein a line contact is provided between the clamping ring and the gas tube.

5. An airbag arrangement in accordance with claim 2, wherein the gas tube is held between a convexly curved support surface of the gas outlet and a substantially straight or less strongly concavely curved support surface of the clamping ring.

6. An airbag arrangement in accordance with claim 1, wherein the gas tube is secured by a clamping ring to the gas outlet with a run-up inclination being provided at the gas outlet and at the clamping ring.

7. An airbag arrangement in accordance with claim 1, wherein the gas tube is secured by a clamping ring to the gas outlet, with a region adjoining one tube end being cut free between the clamping ring and the gas outlet in order to enable angular movement of the gas tube.

8. An airbag arrangement in accordance with claim 1, wherein a front-side end section of the gas tube has a circular cross-section.

9. An airbag arrangement in accordance with claim 1, wherein the gas tube is secured by a clamping ring to the gas outlet, with the clamping ring having a flange which limits angular movement of the gas tube.

10. An airbag arrangement in accordance with claim 1, wherein the gas outlet is provided as a separate part which can be welded or screwed to the gas generator.

11. An airbag arrangement in accordance with claim 1, wherein the gas tube is secured by a clamping ring to the gas outlet with a run-up inclination being provided at the gas outlet or at the clamping ring.

12. An airbag arrangement in accordance with claim 1, wherein gas outlet forms the ball of the ball and socket joint.

* * * * *